US012726361B2

(12) United States Patent
Lee et al.

(10) Patent No.: US 12,726,361 B2
(45) Date of Patent: Sep. 1, 2026

(54) METHOD, APPARATUS, AND COMPUTER-READABLE RECORDING MEDIUM FOR CONTROLLING ACCESS OF USER AND USER TERMINAL THAT ACCESS SERVER SYSTEM USING DIGITAL SIGNATURE

(71) Applicant: SGA Solutions Co., Ltd., Seoul (KR)

(72) Inventors: Ki Uk Lee, Seongnam-si (KR); Jae Hyeok Park, Seoul (KR)

(73) Assignee: SGA Solutions Co., Ltd., Seoul (KR)

( * ) Notice: Subject to any disclaimer, the term of this patent is extended or adjusted under 35 U.S.C. 154(b) by 12 days.

(21) Appl. No.: 18/892,466

(22) Filed: Sep. 22, 2024

(65) Prior Publication Data

US 2025/0158832 A1 May 15, 2025

(30) Foreign Application Priority Data

Nov. 15, 2023 (KR) ........................ 10-2023-0157997

(51) Int. Cl.
*G06F 21/00* (2013.01)
*H04L 9/32* (2006.01)

(52) U.S. Cl.
CPC .................................. *H04L 9/3247* (2013.01)

(58) Field of Classification Search
CPC ...................................................... H04L 9/3247
See application file for complete search history.

(56) References Cited

U.S. PATENT DOCUMENTS

| | | | | |
|---|---|---|---|---|
| 11,665,001 | B1 * | 5/2023 | Engelkemier | G06F 21/575 713/2 |
| 2018/0198764 | A1 * | 7/2018 | Kumar | H04L 63/126 |
| 2022/0286301 | A1 * | 9/2022 | Omori | G06F 21/31 |
| 2025/0184152 | A1 * | 6/2025 | Kubo | H04L 63/04 |

FOREIGN PATENT DOCUMENTS

| | | |
|---|---|---|
| KR | 10-0589686 | 6/2006 |
| KR | 10-0844293 | 7/2008 |
| KR | 10-1937136 | 1/2019 |
| KR | 10-2019-0048587 | 5/2019 |
| KR | 10-2022-0009388 | 1/2022 |

OTHER PUBLICATIONS

"Office Action for Korea Patent Application No. 10-2023-0157997, mailed Dec. 28, 2023."

* cited by examiner

*Primary Examiner* — Rodman Alexander Mahmoudi

(57) ABSTRACT

A method for controlling access of a user and a user terminal that access a server system using a digital signature includes: performing identity confirmation on a user and a user terminal requesting an access to a server system by using a trust determination machine in which user information and user terminal information are registered; determining a trust level by performing trust evaluation on the user and the user terminal; requesting a digital signature by generating a digital signature request message including determined trust level information, and transmitting the generated digital signature request message to the user terminal; verifying the digital signature by performing verification on the generated signature response; and determining whether there is an access of the user and the user terminal to the server system according to the determined trust level of the user and the user terminal and a verification result of the digital signature.

10 Claims, 8 Drawing Sheets

METHOD, APPARATUS, AND COMPUTER-READABLE RECORDING MEDIUM FOR CONTROLLING ACCESS OF USER AND USER TERMINAL THAT ACCESS SERVER SYSTEM USING DIGITAL SIGNATURE

BACKGROUND OF THE INVENTION

1. Field of the Invention

The present invention relates to a method for controlling an access of a user and a user terminal that access a server system using a digital signature, and more specifically, to a technique of performing trust evaluation on a user and a user terminal by verifying a digitally signed value by a trust determination machine when identity of the user and the user terminal is confirmed, and controlling an access to a server system based on the trust evaluation.

2. Description of the Related Art

With the development of IT, due to changes in a working environment such as the spread of various infectious diseases, the frequency of remote work or work-from-home at one's own home or separate place without going to work is increasing. However, there has been a limitation that workers who handle sensitive information, including business secrets of companies or personal information, cannot work remotely or from home because there was no proper monitoring method for the leakage of sensitive information.

Meanwhile, Korean Registered Patent No. 10-2402705 discloses a configuration for performing a verification process of a verification module according to at least one scenario for multi-factor security authentication for mobile remote control in a network separation environment.

However, the above-described related art has a limitation in that it is not possible to monitor a behavior-based abnormal symptom of the user or prevent illegal leakage after the user accessing the mobile device has passed authentication, so that there is a need for an intelligent security solution that can monitor a user's access environment even after the user succeeds in security authentication and immediately respond to detection of malicious behavior.

SUMMARY OF THE INVENTION

Accordingly, a first object of the present invention is to enhance a security solution of a server system, such as preventing security accidents like digital identity theft, by allowing identity confirmation based on a digital signature to be performed when identity of a user and a user terminal accessing the server system is confirmed, thereby allowing only the reliable user and user terminal to access the server system.

In addition, a second object of the present invention is to provide a security technique of a server system, which continuously monitors a work behavior of a user and a user terminal after the reliable user and user terminal access the server system, and continuously verifies the work behavior of the user and the user terminal, thereby rapidly detecting occurrence of a malicious behavior and immediately coping with the malicious behavior.

To achieve the above objects, according to one embodiment of the present invention, a method for controlling access of a user and a user terminal that access a server system using a digital signature, which is implemented by a computing device including one or more processors and one or more memories for storing instructions executable in the processors, includes: an identity confirmation step of performing identity confirmation on the user and the user terminal requesting an access to a server system by using a trust determination machine in which user information and user terminal information are registered; a trust level determination step of determining a trust level by performing trust evaluation on the user and the user terminal, when it is confirmed that the user and the user terminal are reliable in the identity confirmation step; a digital signature request step of requesting a digital signature by generating a digital signature request message including determined trust level information, and transmitting the generated digital signature request message to the user terminal, when the trust level for the user and user terminal is determined; a digital signature verification step of, when a signature response is generated by the user terminal that makes the digital signature on the digital signature request message, verifying the digital signature by performing verification on the generated signature response through the trust determination machine; and an access control step of determining whether there is an access of the user and the user terminal to the server system according to the determined trust level of the user and the user terminal and a verification result of the digital signature.

The method may further include an identity registration step of registering a pair of the user information and the user terminal information in the trust determination machine, before the identity confirmation step, in which the user information may include information about a user's public key for the digital signature issued after identity confirmation by a predetermined identity authentication institution.

In addition, the user terminal, which receives the digital signature request message in the digital signature request step, may generate a signature response by making the digital signature with the private key, and in the digital signature verification step, the signature response of the user may be verified using the user's public key that is preregistered in the trust determination machine.

In addition, in the server system, a plurality of managed resources may be grouped into a plurality of groups according to importance, and the digital signature request message may include an additional authentication option according to the importance of resources that are access targets of the user and the user terminal.

In addition, when the identity registration step is performed, user information including at least one of biometric recognition information, card information, public certificate information, and IP address information about the user may be registered in the trust determination machine as additional authentication information about the user, and when the additional authentication option is included in the digital signature request message, an authentication response for at least one of the additional authentication information may be replied.

In addition, the access control step may include allowing the user and the user terminal to access the server system when the trust level of the user and user terminal is equal to or higher than a predetermined threshold trust level and the verification of the digital signature is successful, and the method may further comprise a monitoring step of monitoring a work behavior of the user terminal in the server system after the user and the user terminal access the server system, so that it is monitored whether there is a detection of a malicious behavior of the user and the user terminal.

In addition, the monitoring step may include lowering a predetermined trust level of the user terminal when the malicious behavior of the user and user terminal is detected in the server system, and expiring an access session for the server system when it is determined impossible to restore the trust level within a threshold time.

In addition, in the trust level determination step, the trust evaluation may be performed by calculating a risk score based on a scenario assuming an attack situation of an attacker, when the trust evaluation of the user and the user terminal is performed, and the scenario may include one or more of a first scenario for calculating the risk score according to an access location of the user terminal, a second scenario for calculating the risk score according to the number of authentication requests required for the user terminal, a third scenario for calculating the risk score according to a difficulty level of an access condition set for a specific resource that is an access target of the user terminal, a fourth scenario for calculating the risk score according to a level of access authority granted to the user terminal, and a fifth scenario for calculating the risk score according to a potential impact level due to an attack on the user terminal by the attacker.

Meanwhile, an apparatus for controlling access of a user and user terminal that access a server system using a digital signature, which is implemented in a computing device including one or more processors and one or more memories for storing instructions executable in the processors, includes: an identity confirmation unit that performs identity confirmation on the user and the user terminal requesting an access to a server system by using a trust determination machine in which user information and user terminal information are registered; a trust level determination unit that determines a trust level by performing trust evaluation on the user and the user terminal, when it is confirmed that the user and the user terminal are reliable in the identity confirmation step; a digital signature request unit that requests a digital signature by generating a digital signature request message including determined trust level information, and transmits the generated digital signature request message to the user terminal, when the trust level for the user and user terminal is determined; a digital signature verification unit that, when a signature response is generated by the user terminal that makes the digital signature on the digital signature request message, verifying the digital signature by performing verification on the generated signature response through the trust determination machine; and an access control unit that determines whether there is an access of the user and the user terminal to the server system according to the determined trust level of the user and the user terminal and a verification result of the digital signature.

On the other hand, a computer-readable recording medium stores instructions for allowing a computing device to perform the following steps, in which the steps include: an identity confirmation step of performing identity confirmation on the user and the user terminal requesting an access to a server system by using a trust determination machine in which user information and user terminal information are registered; a trust level determination step of determining a trust level by performing trust evaluation on the user and the user terminal, when it is confirmed that the user and the user terminal are reliable in the identity confirmation step; a digital signature request step of requesting a digital signature by generating a digital signature request message including determined trust level information when the trust level for the user and user terminal is determined, and transmitting the generated digital signature request message to the user terminal; a digital signature verification step of, when a signature response is generated by the user terminal that makes the digital signature on the digital signature request message, verifying the digital signature by performing verification on the generated signature response through the trust determination machine; and an access control step of determining whether there is an access of the user and the user terminal to the server system according to the determined trust level of the user and the user terminal and a verification result of the digital signature.

According to one embodiment of the present invention, it is possible to perform a thorough identity confirmation of a user accessing a server system by determining a user and a trust level of the user based on the digital signature, and to prevent denial of a user behavior in the server system.

In addition, according to one embodiment of the present invention, unlike the conventional access control technique in which access control is performed by verifying a trust level of the user and the user terminal at a time point at which the user and the user terminal access the server system, the present invention may protect resources managed in the server system and minimize damage caused by security threats by continuously monitoring the trust level of the user and the user terminal even after the user and the user terminal access the server system to function to rapidly detect the maliciously changed user and user terminal.

DETAILED DESCRIPTION OF THE INVENTION

Figure 1:
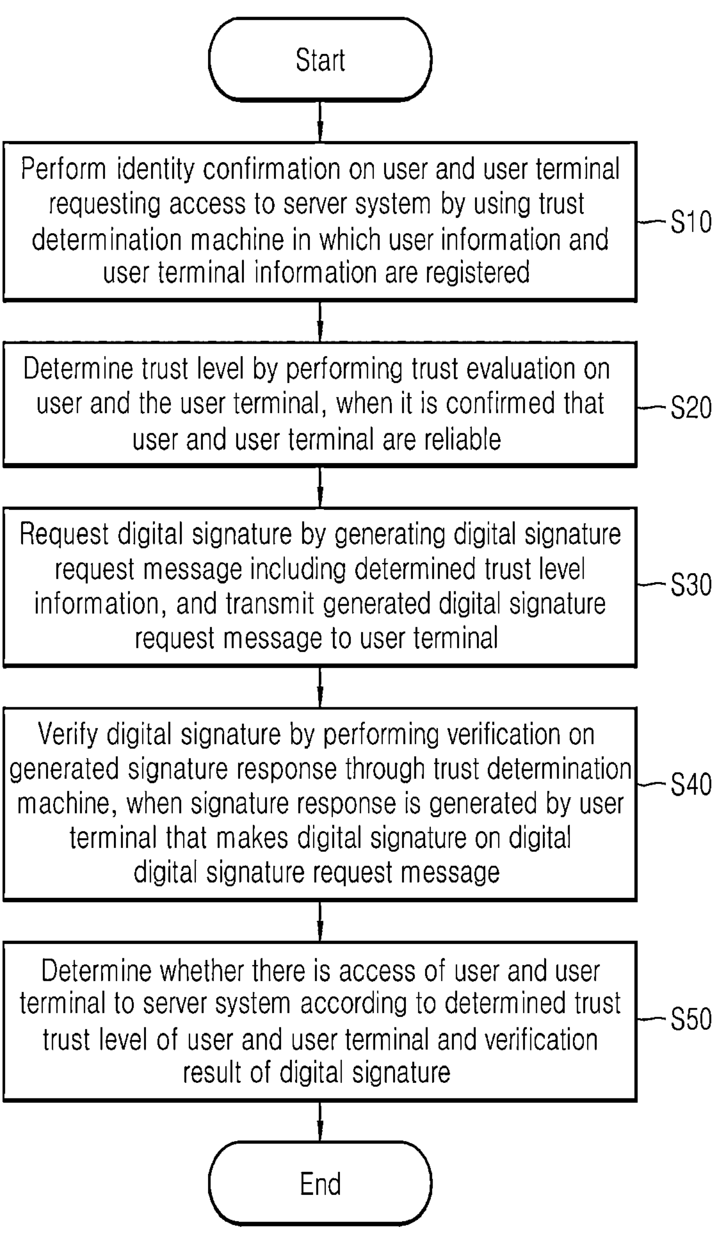
FIGS. 1 to 3 are flowcharts of a method for controlling an access of a user and a user terminal that access a server system using a digital signature according to one embodiment of the present invention.

Hereinafter, various embodiments and/or aspects will be disclosed with reference to drawings. In the following description, multiple concrete details will be disclosed in order to help general understanding of one or more aspects for the purpose of description. However, it will be recognized by those skilled in the art that the aspect(s) may be executed without the concrete details. In the following description and accompanying drawings, specific exemplary aspects of one or more aspects will be described in detail. However, the aspects are exemplary, and some equivalents of various aspects may be used, and the descriptions herein are intended to include both the aspects and equivalents thereto.

It is not intended that any “embodiment”, “example”, “aspect”, “illustration”, and the like used in the specification is preferable or advantageous over any other "embodiment", "example", "aspect", "illustration", and the like.

Further, the terms "includes" and/or "including" mean that a corresponding feature/or component exists, but it should be appreciated that the terms "include" or "including" mean that presence or addition of one or more other features, components, and/or a group thereof is not excluded.

Further, terms including an ordinal number such as "first" or "second' may be used for the names of various components, not limiting the components. The above terms are used merely for the purpose of distinguishing one element from another element. For example, a first component may be referred to as a second component and vice versa without departing the scope of the present disclosure. The term "and/or" includes a combination of a plurality of related enumerated items or any of the plurality of related enumerated items.

In addition, unless otherwise defined, all terms used herein, including technical or scientific terms, have the same meaning as commonly understood by one of ordinary skill in the art to which this invention belongs. Terms such as those defined in commonly used dictionaries should be interpreted as having a meaning consistent with the contextual meaning of the related art and should not be interpreted as either ideal or overly formal in meaning unless explicitly defined in the present invention.

A first object of the present invention is to enhance a security solution of a server system, such as preventing security accidents like digital identity theft, by allowing identity confirmation based on a digital signature to be performed when identity of a user and a user terminal accessing the server system is confirmed, thereby allowing only the reliable user and user terminal to access the server system, and a second object of the present invention is to provide a security technique of a server system, which continuously monitors a work behavior of a user and a user terminal after the reliable user and user terminal access the server system, and continuously verifies the work behavior of the user and the user terminal, thereby rapidly detecting occurrence of a malicious behavior and immediately coping with the malicious behavior.

Hereinafter, a detailed description of the present invention for achieving the above objects will be hereinafter described with reference to accompanying drawings, and a plurality of drawings will be referenced simultaneously to describe one or more technical features or components constituting the invention.

First, referring to FIG. 1, FIG. 1 shows a configuration diagram of a method for controlling an access of a user and a user terminal that access a server system using a digital signature according to one embodiment of the present invention.

As shown in FIG. 1, according to the present invention, an identity confirmation step S10 of performing identity confirmation on a user and a user terminal 30 requesting an access to a server system 40 is performed by using a trust determination machine 20 in which the user information and information about the user terminal 30 are registered.

The user information described in step S10 refers to information capable of identifying the user. For example, the user information is information used to authenticate the user, including basic information such as name, affiliation, and employee number of the user, and may further include at least one of information about a public key of the digital signature, public certificate information about the user, IP address information mainly used by the user, biometric recognition information including a fingerprint and a face ID of the user, and card information.

In addition, the information about the user terminal 30 in step S10 may be understood as a concept of information (e.g., an identification code uniquely assigned to each terminal, etc.) capable of identifying a personal terminal owned by the user or a company terminal provided to the user.

Figure 2:
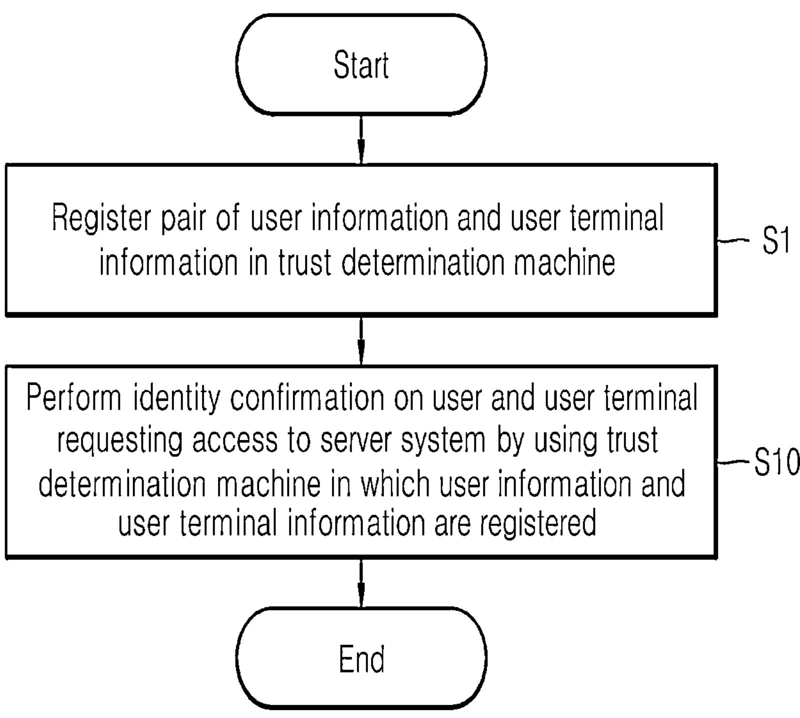

Meanwhile, to this end, as shown in FIG. 2, according to the preferred embodiment of the present invention, an identity registration step S1 of registering a pair of the user information and the information about the user terminal 30 in the trust determination machine 20 is performed before step S10 described above.

Preferably, the user information essentially registers information about a user's public key for the digital signature issued after the identity is confirmed in a predetermined identity authentication institution, in which the public key of the digital signature is used as a unit for authenticating whether the accessing user is a reliable user according to whether the user matches with the private key when the user uses the private key upon digital signature in a digital signature verification step, which will be described later.

In addition, in step S1, as described above, user information including at least one of biometric recognition information, card information, public certificate information, and IP address information about the user may be registered in the trust determination machine 20, and at least one of the user information may be used as additional authentication information about the user, but the present invention is not limited thereto.

Referring back to FIG. 1, when it is confirmed that the user and the user terminal 30 are reliable as a result of the identity confirmation in step S10, a trust level determination step S20 of determining a trust level by performing trust evaluation on the user and the user terminal 30 is performed.

Specifically, in step S20 of the present invention, when the trust evaluation of the user and the user terminal 30 is performed, the trust evaluation is performed by calculating a risk score based on a scenario assuming an attack situation of an attacker.

Figure 4:
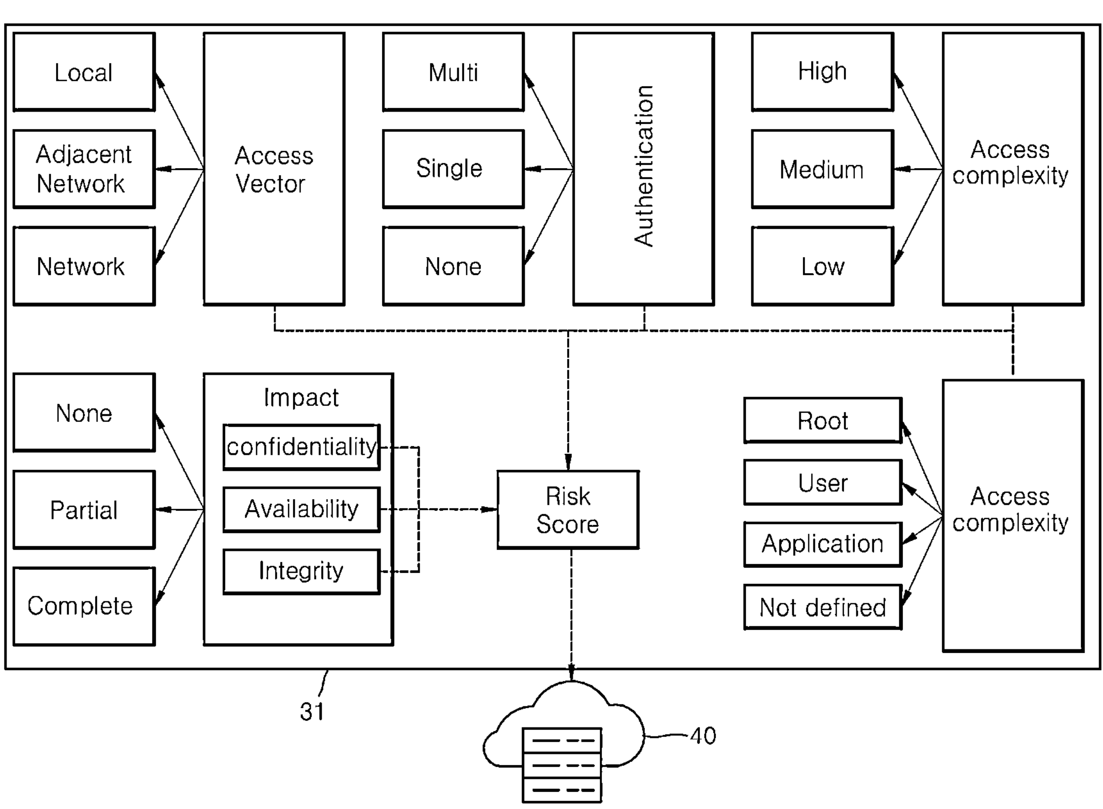
FIG. 4 is a conceptual diagram for calculating a risk score for each scenario used in trust evaluation according to one embodiment of the present invention.

Preferably, the above-described scenario may include a plurality of scenarios as shown in FIG. 4, and a security agent 31 installed in the user terminal 30 calculates a risk score for a security state of the user terminal 30 through a registry in the user terminal 30 to perform the trust evaluation.

As a first embodiment, the above-described scenario may include a first scenario (access vector) that calculates the risk score according to an access location of the user terminal 30. In this case, the first scenario determines whether the network connected to the user terminal 30 is a local network (internal a network), neighboring network (Telnet, FTP restricted network, etc.), or an external network, and then assigns the lowest risk score among the assigned risk scores when the network connected to the user terminal 30 is the local network, and assigns the highest risk score among the assigned risk scores when the network connected to the user terminal 30 is the external network. As a more specific example, the risk score of the first scenario may have a score of 5 to 15, in which the score of 5 is assigned when the user terminal 30 is connected to the local network, the score of 10 is assigned when the user terminal 30 is connected to the neighboring network, and the score of 15 is assigned when the user terminal 30 is connected to the external network, so that the farther the network is from the host, the highest risk score among the assigned scores is assigned.

As a second embodiment, the above-described scenario may include a second scenario (authentication) that calculates the risk score according to the number of authentication requests required by the user terminal 30. In this case, the second scenario assigns the risk score according to whether an additional authentication is required even after an attacker attacking through the user terminal 30 accesses the in-house network. For example, the lowest risk score is assigned among the assigned risk scores when the user terminal 30 requires two or more times of authentication, and the highest risk score is assigned among the assigned risk scores when the user terminal 30 requires less than one time of authentication (that is, when a separate authentication is not required). As a more specific example, the risk score of the second scenario may have a score of 5 to 15, in which the score of 5 is assigned when the user terminal 30 requires two or more times of authentication, the score of 10 is assigned when the user terminal 30 requires one time of authentication, and the score of 15 is assigned when the user terminal 30 requires less than one time of authentication, so that the fewer or non-existent the number of authentications, the higher the risk score is assigned.

As a third embodiment, the above-described scenario may include a third scenario (access complexity) that calculates the risk score according to a difficulty level of an access condition set for a specific resource that is an access target of the user terminal 30. In this case, the third scenario assigns the lowest risk score when the difficulty level (access complexity) of the access condition set for the specific resource corresponds to a higher level, and assigns the highest risk score when the access condition is not set for the specific resource and the difficulty level of the access condition corresponds to a lower level. Meanwhile, the difficulty level of the access condition is a measure of how complicated the access condition needs to be solved for the attacker to attack the specific and resource, as one embodiment, it may be understood that when the difficulty level of the access condition is the higher level, the access condition that may be solved by a professional hacker is set, and when the difficulty level of the access condition is the lower level, the access condition that may be accessed by anyone or an automation tool is set. As a more specific embodiment, the risk score of the third scenario may have a score of 5 to 15, in which the score of 5, which is the lowest risk score among the assigned risk scores, is assigned when the difficulty level of access is high, the score of 10 among the assigned risk score is assigned when the difficulty level of access is normal, and the score of 15, which is the highest risk score among the assigned risk score, is assigned when the difficulty level of access is low, so that the easier the attacker attacks, the higher the risk score is assigned.

As a fourth embodiment, the above-described scenario may include a fourth scenario (privileged level) that calculates the risk score according to a level of an access authority granted to the user terminal 30. In this case, the fourth scenario assigns the lowest risk score among the assigned risk score because damage to the attack is extremely small when the access authority to resources managed by the in-house network is not granted to the user terminal 30, and assigns the highest risk score among the assigned risk score because the access to all resources managed by the in-house network is possible when the access authority granted to the user terminal 30 is a root authority. As a more specific example, the risk score of the fourth scenario may have a score of 5 to 20, in which the score of 5, which is the lowest risk score, is assigned to a state in which a separate access authority is not set (Not defined), the risk score of 10 is assigned to an application authority, the risk score of 15 is assigned to a user authority, and the risk score of 20, which is the highest risk score, is assigned to a root authority such as an actual administrator authority, so that the higher the authority, the higher the risk score is assigned.

As a fifth embodiment, the above-described scenario may include a fifth scenario (impact) that calculates the risk score according to a potential impact level due to the attack on the user terminal 30 by the attacker. In this case, the fifth scenario may calculate a risk score for a potential impact level based on one or more factors of confidentiality, integrity, and availability in detail, in which, particularly, the confidentiality refers to calculation for a risk score with respect to the extent of information leaked due to the attack, the integrity refers to calculation for a risk score with respect to the extent of information manipulated due to the attack, and the availability refers to calculation for a risk score with respect to the extent of a service damaged by the attack. As a more specific example, the risk score of the fifth scenario may have a score of 0 to 20 for each factor, in which the score of 0 is assigned when there is no impact level due to the attack of the user terminal 30, the score of 10 is assigned when there is a partial impact, and the score of 20 is assigned when there is a complete impact, so that the higher the impact, the higher the risk score is assigned.

In step S20 of the present invention, an area in which the security of the user terminal 30 is weak may be confirmed by calculating the risk score for each scenario of the first to fifth scenarios described above, and a determination algorithm, which determines that the higher the risk score, the lower the trust level and the lower the risk score, the higher the trust level by defining the trust level for each risk score section, may be established.

Meanwhile, according to the present invention, when the trust level for the user and the user terminal 30 is determined in step S20 of FIG. 1, a digital signature request step S30 of requesting a digital signature by generating a digital signature request message including determined trust level information, and transmitting the generated digital signature request message to the user terminal 30 is performed.

In this case, the digital signature request message may further include identity information confirmed for the user and the user terminal 30, and the user finally confirms the determined trust level information and the confirmed identity information, and when he or she is correct, the user makes the digital signature with a private key (or secret key) issued by the identity authentication institution.

When a signature response is generated by the user who makes the digital signature through the user terminal 30 on the digital signature message transmitted to the user terminal 30 in step S30, a digital signature verification step S40 of verifying the digital signature by performing verification on the generated signature response through the trust determination machine 20 is performed.

In this case, in step S40, the verification for the signature response of the user is performed using the user's private key that is pre-registered in the trust determination machine 20. In other words, the signature response is encrypted with the user's private key, and whether the encrypted state may be decrypted with the pre-registered user's private key is verified, it is possible to determine whether the user who generated the signature response is a reliable user.

Figure 5:
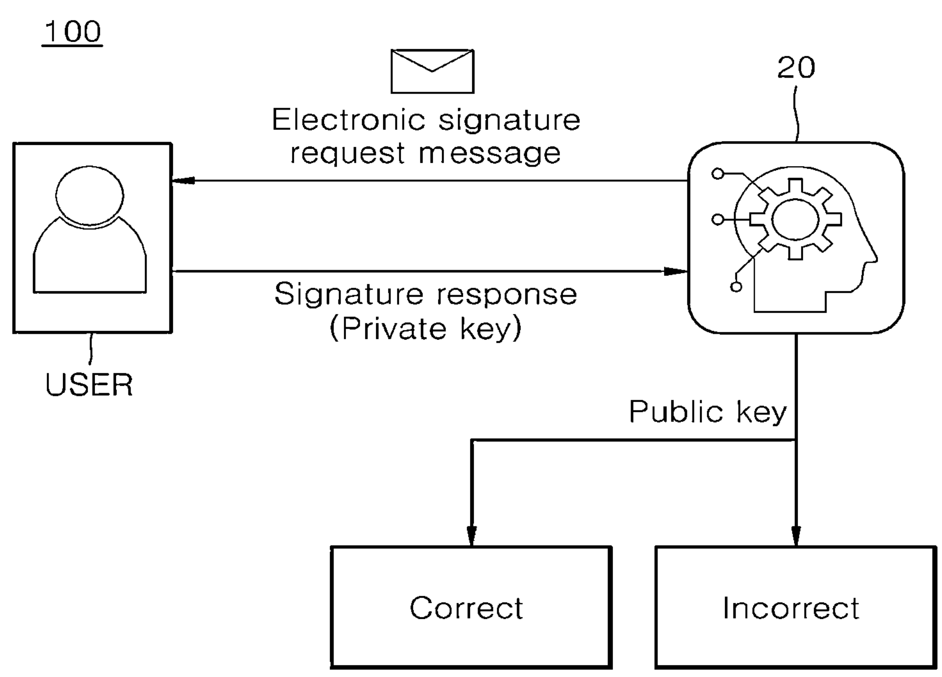
FIG. 5 is a conceptual diagram for digital signature request and verification according to one embodiment of the present invention.

Referring simultaneously to the embodiment 100 of FIG. 5 illustrating the conceptual diagrams of steps S30 and S40 described above, when the trust determination machine 20 transmits a digital signature request message to the user, the user makes the digital signature on the digital signature request message with the private key to generate a signature response and replies to the trust determination machine 20 with the signature response. Thereafter, the trust determination machine 20 may perform a process of confirming whether the replied signature response may be decrypted with the pre-registered user's public key, determining that the user is reliable when the decryption is possible, and determining that the user is unreliable when the decryption is impossible.

That is, according to step S40, not only the thorough identity confirmation of the user terminal 30 is performed, but also the thorough identity confirmation of the user itself is performed based on the digital signature, so that only the reliable user and user terminal 30 may access the server system 40, thereby maximizing security for the server system 40.

Referring back to FIG. 1, according to the present invention, an access control step S50 of determining whether there is an access of the user and the user terminal 30 to the server system 40 according to the determined trust level of the user and the user terminal 30 and a verification result of the digital signature is performed after step S40 described above.

In this case, in step S50, when the trust level of the user and the user terminal 30 is equal to or higher than a predetermined threshold level and the verification of digital signature is successful, the user and the user terminal 30 are allowed to access the server system 40. In other words, when the trust level of the user and the user terminal 30 is less than the predetermined threshold level or the verification of digital signature fails, it may be determined that the access is unreliable, thereby fundamentally blocking the access to the server system 40.

Figure 3:
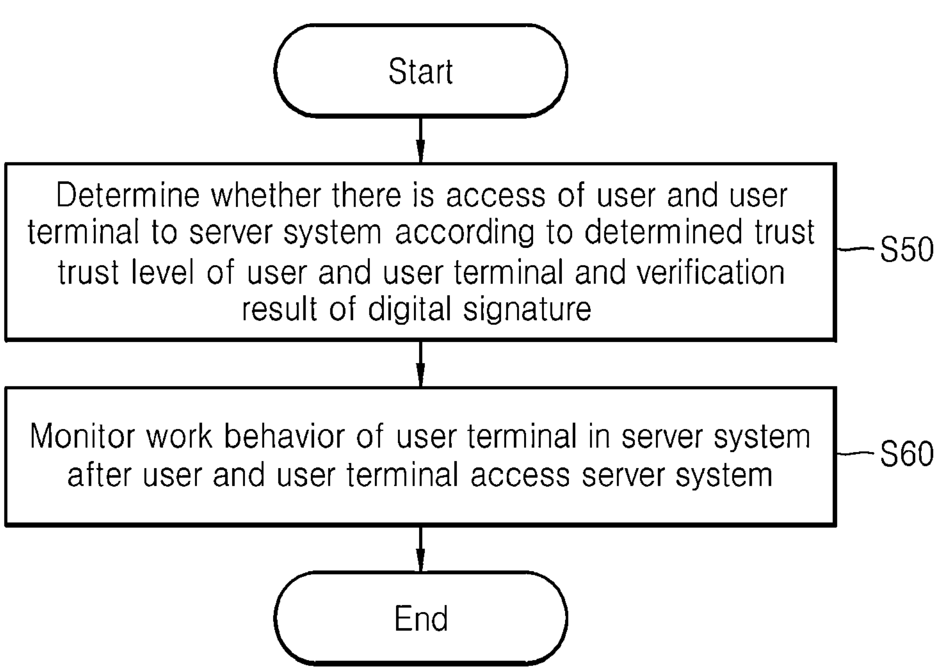

Meanwhile, as another preferred embodiment of the present invention, referring simultaneously to FIG. 3, the present invention may further include a monitoring step S60 of monitoring a work behavior of the user terminal 30 in the server system 40 is performed, after the user and the user terminal 30 access the server system 40 when it is determined that the access of the user and the user terminal 30 to the server system 40 is a reliable access in step S50 described above.

In this case, in step S50, the server system 40 monitors whether there is a detection of a malicious behavior from the user and the user terminal 30. The scope of the malicious behavior detected in step S50 includes both intentional and unintentional behaviors, and examples thereof may include a case where an abnormality is detected in the security state of the user terminal 30, a case where a behavior that violates a designation policy such as IP, GPS, time, etc., is detected, a case where a behavior in which information about the user and the user terminal 30 is changed is detected, etc.

When such malicious behavior is detected, in step S50, a penalty is applied to the access authority of the user who accesses the server system 40 by lowering the predetermined trust level of the user and the user terminal 30. However, according to the present invention, in preparation for a case where an unintentional malicious behavior is performed, when the lowered trust level is restored to the previous trust level within a threshold time (e.g., 1 minute), the penalty of the access authority applied to the user may be recovered.

On the other hand, when the trust level of the user is not recovered within the threshold time after the trust level of the user is lowered, the present invention may determine that the user intentionally performs a malicious behavior, and may expire an access session to the server system 40 to allow all access authorities to the server system 40 to be lost, thereby rapidly blocking an unreliable accessor.

On the other hand, in the server system 40 described in the present invention, a plurality of managed resources may be grouped into a plurality of groups according to importance, and an additional authentication option may be included in the digital signature request message transmitted to the user terminal 30 by the trust determination machine 20 according to importance of resources that are access targets of the user and the user terminal.

In this case, when the determined trust level of the user and the user terminal 30 satisfies access criterion of the server system 40, but does not satisfy the trust level required by the resource that is an access target, the additional authentication option is included in the digital signature request message.

Accordingly, when the additional authentication option is included in the digital signature request message, the trust determination machine 20 requests an authentication response to at least one factor of the additional authentication information about user pre-registered in the trust determination machine 20 from the user terminal 30.

Figure 6:
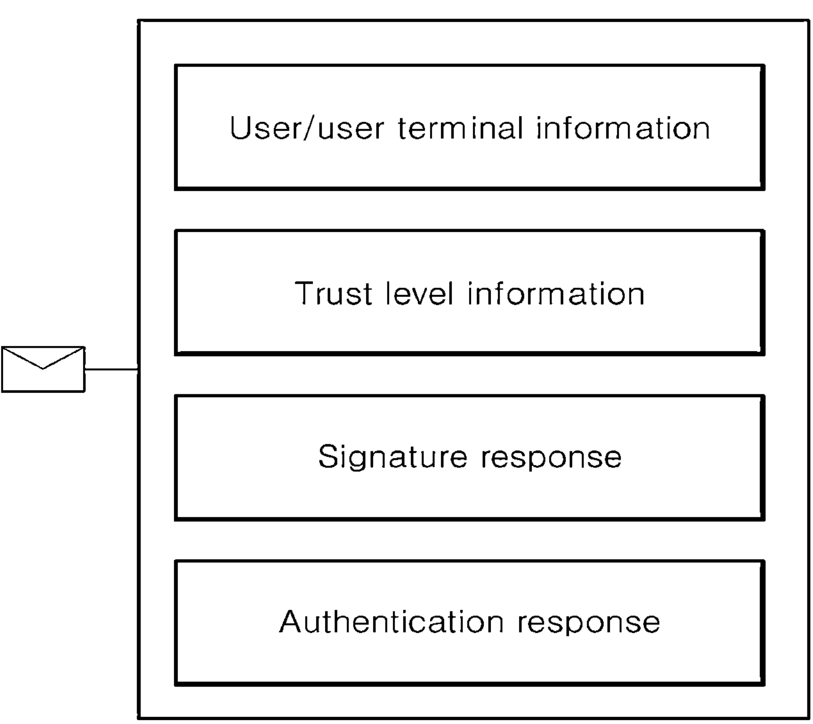
FIG. 6 is a diagram showing an example of a response request and information included in a digital signature request message according to one embodiment of the present invention.

As one embodiment, the trust determination machine 20 may allow biometric recognition information about the user to be included as the additional authentication option in the digital signature request message transmitted to the user terminal 30. In this case, the user terminal 30 makes the digital signature with the private key in response to the digital signature request message, and performs authentication such as fingerprint recognition or face ID, so that the trust determination machine 20 may reply to a message including the authentication response as shown in 110 of FIG. 6, and the trust determination machine 20 verifies the digital signature and compares the authentication response of the user with the pre-registered biometric recognition information so as to determine that the user is reliable only when the verification of the digital signature is successful and the authentication of the biometric recognition information is successful, thereby enhancing the trustability of the identity confirmation and consequently enhancing the security of the server system 40.

As a result, according to one embodiment of the present invention, it is possible to perform a thorough identity confirmation of a user accessing a server system 40 by determining a user and a trust level of the user based on a digital signature, and to prevent denial of a user behavior in the server system 40.

In addition, according to one embodiment of the present invention, unlike the conventional access control technique in which access control is performed by verifying a trust level of the user and the user terminal at a time point at which the user and the user terminal access the server system, the present invention may protect resources managed in the server system 40 and minimize damage caused by security threats by continuously monitoring the trust level of the user and the user terminal 30 even after the user and the user terminal 30 access the server system 40 to function to rapidly detect the maliciously changed user and user terminal 30.

While the embodiments have been described with reference to limited examples and drawings as described above, it will be apparent to one of ordinary skill in the art that various changes and modifications may be made the from above description.

Meanwhile, a configuration of an apparatus 10 for controlling an access of the user and the user terminal 30 that access the server system 40 using a digital signature will be described with reference to FIG. 7.

Figure 7:
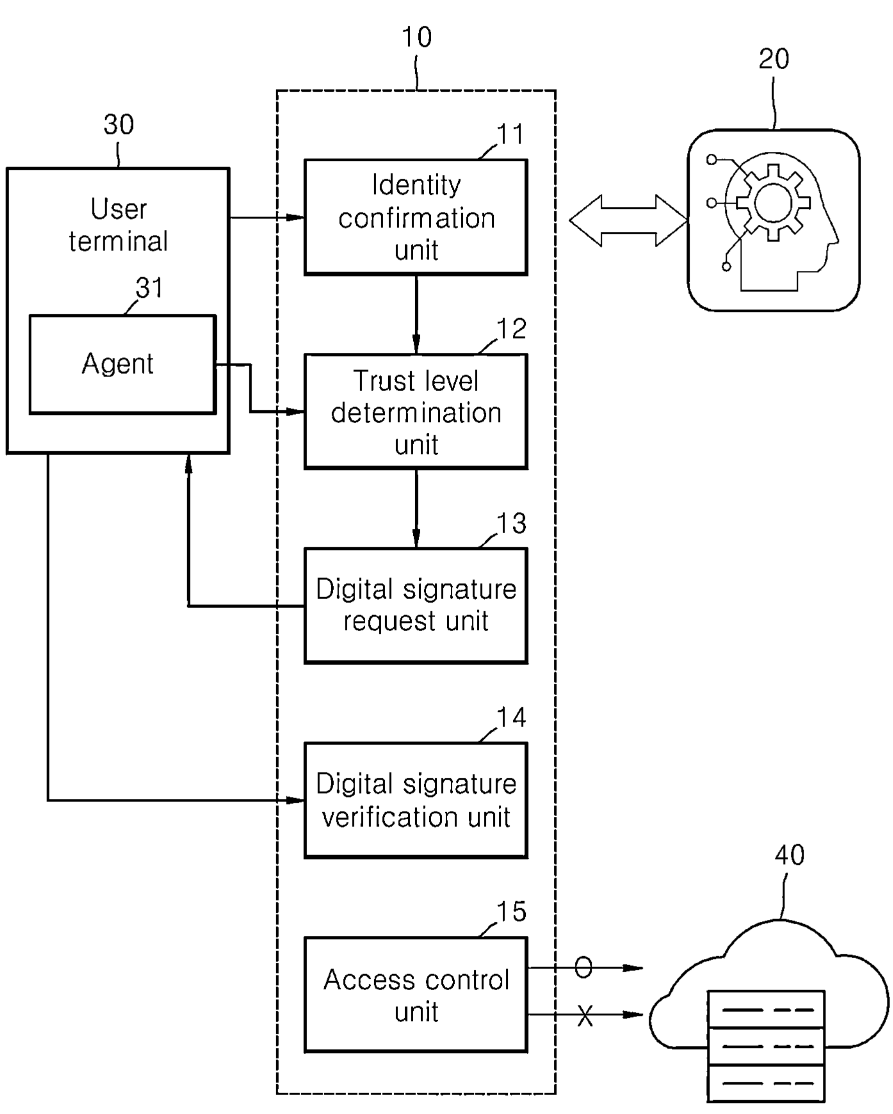
FIG. 7 is a diagram of an apparatus for controlling an access of a user and a user terminal that access a server system using a digital signature according to one embodiment of the present invention.

As shown in FIG. 7, the apparatus 10 of the present invention may include an identity confirmation unit 11, a trust level determination unit 12, a digital signature request unit 13, a digital signature verification unit 14, and an access control unit 15 as main configurations.

Specifically, the above-described identity confirmation unit 11 performs identity confirmation on the user and the user terminal 30 requesting an access to the server system 40 by using the trust determination machine 20 in which the user information and the information about the user terminal 30 are registered. That is, it may be understood that the identity confirmation unit 11 performs all the functions in step S10 of FIG. 1, and according to the present invention, it is primarily determined whether the user registered by the identity confirmation unit 11 has access to the server system 40.

Next, the above-described trust level determination unit 12 functions to determine the trust level by quantitatively performing trust evaluation on the user and the user terminal 30 when the identity confirmation unit 11 verifies that the user and the user terminal 30 are reliable.

In this case, a security agent 31 may be installed in the user terminal 30 to collect a registry in the user terminal 30, and may determine the trust level by recognizing a security state of the user terminal 30 through the collected registry. That is, it may be understood that the above-described trust level determination unit 12 may perform all the functions in step S20 of FIG. 1 described above, and as described above, the trust level determination unit 12 performs trust evaluation on the user and the user terminal 30 using a plurality of scenarios assuming an attack situation on the server system 40, and determines the trust level of the user and the user terminal 30 through the evaluation.

Next, the above-described digital signature request unit 13 performs a function of requesting a digital signature by generating a digital signature request message including determined trust level information, and transmitting the generated digital signature request message to the user terminal 30, when the trust level for the user and the user terminal 30 is determined. That is, it may be understood that the digital signature request unit 13 may perform all the functions in step S30 of FIG. 1 described above, and the digital signature request unit 13 requests a digital signature for the user's private key in the digital signature request message.

Meanwhile, when a signature response is generated by the user terminal 30 that makes the digital signature on the digital signature request message with the private key, the above-described digital signature verification unit 14 verifies the digital signature by performing verification on the generated signature response through the trust determination machine 20. In this case, it may be understood that the signature response may be is verified by performing the trust evaluation of the user who has performed the digital signature based on whether the signature response is decrypted with the user's public key that is pre-registered in the trust determination machine 20, and as a result, the digital signature verification unit 14 may perform all the functions performed in step S40 of FIG. 1.

In addition, the above-described access control unit 15 performs a function of determining whether there is an access of the user terminal 30 to the server system 40 according to a verification result of the digital signature. Specifically, the access control unit 15 may function to access the user and the user terminal 30, which satisfy both a first condition and a second condition, to the server system 40, by setting whether the determined trust level of the user and the user terminal 30 satisfies the trust level required for access to the server system 40 as the first condition and by setting whether the verification of the digital signature is successful as the second condition.

As a result, it will be understood that the access control unit 15 may perform all the functions in step S50 of FIG. 1 described above, and according to the present invention, it is possible to construct a security solution of the server system 40 with enhanced security by fundamentally blocking the access of the unreliable user and user terminal 30.

In addition, although not explicitly shown in FIG. 7, preferably, the apparatus 10 of the present invention may further include an identity registration unit and a monitoring unit in addition to the above-described configurations.

In this case, it may be understood that the identity registration unit performs a function of registering a pair of information and the information about the user the user terminal 30 in the trust determination machine 20, and may perform all the functions in step S1 of FIG. 2 described above.

In addition, the monitoring unit performs a function of monitoring a work behavior of the user terminal 30 in the server system 40 after the user and the user terminal 30 access the server system 40 to detect whether the user and the user terminal 30 perform a malicious behavior.

That is, it may be understood that the monitoring unit performs all the functions in step S60 of FIG. 3, and in the present invention, even after the user and the user terminal 30 access the server system 40 by performing the function of the monitoring unit, the monitoring unit may continuously monitor the user and the user terminal 30 to rapidly detect the user and user terminal 30 maliciously deteriorated intentionally or unintentionally, thereby protecting resources managed by the server system 40 and minimizing damage caused by the attack of the server system 40.

While the embodiments have been described with reference to limited examples and drawings as described above, it will be apparent to one of ordinary skill in the art that various changes and modifications may be made from above description.

Figure 8:
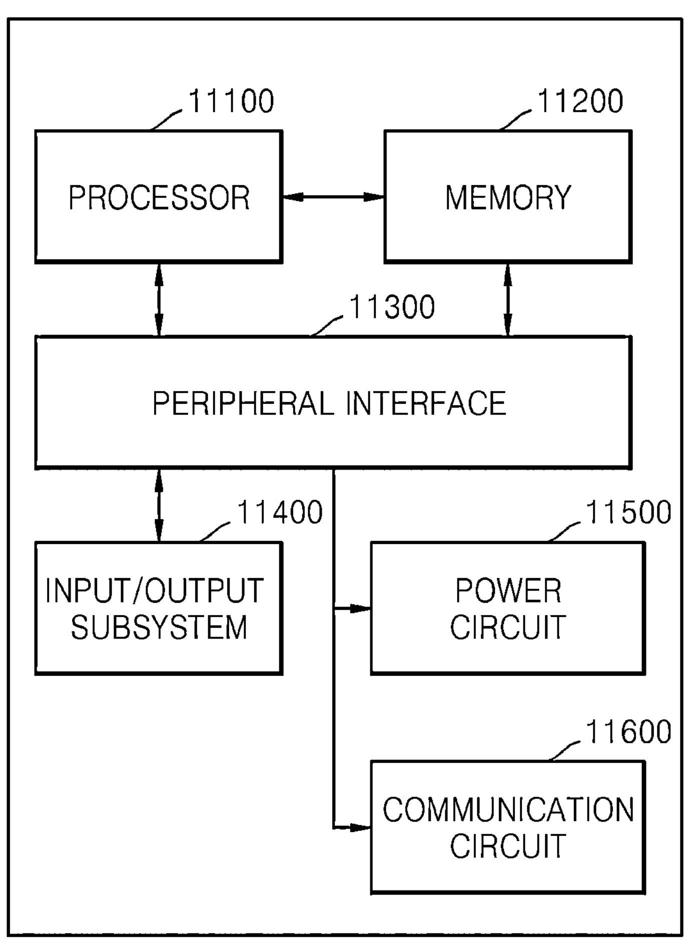
FIG. 8 is a diagram showing an example of an internal configuration of a computing device according to one embodiment of the present invention.

On the other hand, FIG. 8 shows an example of an internal configuration of a computing device according to one embodiment of the present invention. In the following description, unnecessary descriptions for embodiments redundant with those of FIGS. 1 to 7 will be omitted.

As shown in FIG. 8, a computing device 10000 may at least include at least one processor 11100, a memory 11200, a peripheral interface 11300, an input/output (I/O) subsystem 11400, a power circuit 11500, and a communication circuit 11600. In this case, the computing device 10000 may correspond to a user terminal A connected to a tactile interface device, or correspond to a computing device B described above.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 10000.

In this case, access to the memory 11200 from other components of the processor 11100 or the peripheral interface 11300, may be controlled by the processor 11100.

The peripheral interface 11300 may combine an input and/or output peripheral device of the computing device 10000 to the processor 11100 and the memory 11200. The processor 11100 may execute the software module or the instruction set stored in the memory 11200, thereby performing various functions for the computing device 10000 and processing data.

The input/output subsystem 11400 may combine various input/output peripheral devices to the peripheral interface 11300. For example, the input/output subsystem 1140 0 may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the input/output subsystem 11400.

The power circuit 11500 may provide power to all or a portion of the components of the terminal. The power circuit 11500 may include a power management system, one or more power supplies such as a battery or alternating current (AC), a charging system, a power failure detection circuit, a power converter or inverter, a power status indicator, or any other components for power generation, management, and distribution.

The communication circuit 11600 may use at least one external port to enable communication with other computing devices.

Alternatively, as described above, the communication circuit 11600 may include an RF circuit, if needed, to transmit and receive an RF signal, also known as an electromagnetic signal, thereby enabling communication with other computing devices.

The above embodiment of FIG. 8 is merely one example of the computing device 10000, and the computing device 10000 may have a configuration or arrangement that omits some of the components shown in FIG. 8, further includes an additional component that is not shown in FIG. 8, or combines at least two components. For example, a computing device for a communication terminal in a mobile environment may further include a touch screen, a sensor, or the like, in addition to the components shown in FIG. 8. The communication circuit 11600 may include a circuit for RF communication of various communication schemes (such as WiFi, 3G, LTE, Bluetooth, NFC, and Zigbee). The components that may be included in the computing device 10000 may be implemented by hardware, software, or a combination of both hardware and software which include at least one integrated circuit specialized in a signal processing or an application.

The methods according to the embodiments of the present invention may be implemented in the form of program instructions to be executed through various computing devices so as to be recorded in a computer-readable medium. In particular, a program according to the embodiment of the present invention may be configured as a PC-based program or an application dedicated to a mobile terminal. The application to which the present invention is applied may be installed in a user terminal through a file provided by a file distribution system. For example, a file distribution system may include a file transmission unit (not shown) that transmits the file according to the request of the user terminal.

The above-described device may be implemented by hardware components, software components, and/or a combination of hardware components and software components. For example, the devices and components described in the embodiments may be implemented by using at least one general purpose computer or special purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system.

In addition, the processing device may access, store, manipulate, process, and create data in response to the execution of the software. For the further understanding, in some cases, one processing device may be used, however, those skilled in the art will be appreciated that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, an instruction, or a combination of at least one thereof, may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, and storage medium or device. The software may be distributed over computing devices connected to networks, so as to be stored or executed in a distributed manner. The software and data may be stored in at least one computer-readable recording medium.

The method according to the embodiments may be recorded in computer-readable media including program instructions to implement various operations embodied by a computer. The computer-readable medium may also include, alone or in combination with the program instructions, data files, data structures, and the like. The program instruction recorded in the medium may be specially designed and configured for the embodiment, or may be publicly known and available to those skilled in the art of computer software. Examples of computer-readable recording media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While the embodiments have been described with reference to limited examples and drawings as described above, it will be apparent to one of ordinary skill in the art that various changes and modifications may be made from the above description. Suitable results may be achieved if the described techniques are performed in a different order, and/or if components in a described system, architecture, device, or circuit are combined in a different manner, and/or replaced or supplemented by other components or their equivalents. Therefore, other implementations, other embodiments, and equivalents of the claims are within the scope of the following claims.

What is claimed is:

1. A method for controlling access of a user and a user terminal that access a server system using a digital signature, which is implemented by a computing device including one or more processors and one or more memories for storing instructions executable in the processors, the method comprising:

an identity confirmation step of performing identity confirmation on the user and the user terminal requesting an access to the server system by using a trust determination machine in which user information and user terminal information are registered;

a trust level determination step of determining a trust level by performing trust evaluation on the user and the user terminal, when it is confirmed that the user and the user terminal are reliable in the identity confirmation step;

a digital signature request step of requesting a digital signature by generating a digital signature request message including determined trust level information, and transmitting the generated digital signature request message to the user terminal, when the trust level for the user and user terminal is determined;

a digital signature verification step of, when a signature response is generated by the user terminal that makes the digital signature on the digital signature request message, verifying the digital signature by performing verification on the generated signature response through the trust determination machine; and an access control step of determining access of the user and the user terminal to the server system according to the determined trust level of the user and the user terminal and a verification result of the digital signature.

2. The method of claim 1, further comprising an identity registration step of registering a pair of the user information and the user terminal information in the trust determination machine, before the identity confirmation step, wherein the user information includes information about a user's public key for the digital signature issued after the identity confirmation by a predetermined identity authentication institution.

3. The method of claim 2, wherein the user terminal, which receives the digital signature request message in the digital signature request step, generates the signature response by making the digital signature with a private key, and in the digital signature verification step, the signature response of the user is verified using the user's public key that is pre-registered in the trust determination machine.

4. The method of claim 2, wherein in the server system, a plurality of managed resources are grouped into a plurality of groups according to importance, and the digital signature request message includes an additional authentication option according to the importance of resources that are access targets of the user and the user terminal.

5. The method of claim 4, wherein, when the identity registration step is performed, user information including at least one of biometric recognition information, card information, public certificate information, and IP address information about the user is registered in the trust determination machine as additional authentication information about the user, and when the additional authentication option is included in the digital signature request message, an authentication response for at least one of the additional authentication information is replied.

6. The method of claim 1, wherein the access control step includes allowing the user and the user terminal to access the server system when the trust level of the user and user terminal is equal to or higher than a predetermined threshold trust level and the verification of the digital signature is successful, and the method further comprises a monitoring step of monitoring a work behavior of the user terminal in the server system after the user and the user terminal access the server system, so that it is monitored whether there is a detection of a malicious behavior of the user and the user terminal.

7. The method of claim 6, wherein the monitoring step includes lowering a predetermined trust level of the user terminal when the malicious behavior of the user and user terminal is detected in the server system, and expiring an access session for the server system when it is determined impossible to restore the trust level within a threshold time.

8. The method of claim 1, wherein in the trust level determination step, the trust evaluation is performed by calculating a risk score based on a scenario assuming an attack situation of an attacker, when the trust evaluation of the user and the user terminal is performed, and the scenario includes one or more of a first scenario for calculating the risk score according to an access location of the user terminal, a second scenario for calculating the risk score according to the number of authentication requests required for the user terminal, a third scenario for calculating the risk score according to a difficulty level of an access condition set for a specific resource that is an access target of the user terminal, a fourth scenario for calculating the risk score according to a level of access authority granted to the user terminal, and a fifth scenario for calculating the risk score according to a potential impact level due to an attack on the user terminal by the attacker.

9. An apparatus for controlling access of a user and user terminal that access a server system using a digital signature, which is implemented in a computing device including one or more processors and one or more memories for storing instructions executable in the processors, the apparatus comprising:

an identity confirmation unit that performs identity confirmation on the user and the user terminal requesting an access to the server system by using a trust determination machine in which user information and user terminal information are registered;

a trust level determination unit that determines a trust level by performing trust evaluation on the user and the user terminal, when it is confirmed that the user and the user terminal are reliable in the identity confirmation step;

a digital signature request unit that requests a digital signature by generating a digital signature request message including determined trust level information, and transmits the generated digital signature request message to the user terminal, when the trust level for the user and user terminal is determined;

a digital signature verification unit that, when a signature response is generated by the user terminal that makes the digital signature on the digital signature request message, verifying the digital signature by performing verification on the generated signature response through the trust determination machine; and an access control unit that determines access of the user and the user terminal to the server system according to the determined trust level of the user and the user terminal and a verification result of the digital signature.

10. A non-transitory computer-readable recording medium that stores instructions for allowing a computing device to perform the following steps, wherein the steps comprise:

an identity confirmation step of performing identity confirmation on the user and the user terminal requesting an access to a server system by using a trust determination machine in which user information and user terminal information are registered;

a trust level determination step of determining a trust level by performing trust evaluation on the user and the user terminal, when it is confirmed that the user and the user terminal are reliable in the identity confirmation step;

a digital signature request step of requesting a digital signature by generating a digital signature request message including determined trust level information when the trust level for the user and user terminal is determined, and transmitting the generated digital signature request message to the user terminal;

a digital signature verification step of, when a signature response is generated by the user terminal that makes the digital signature on the digital signature request message, verifying the digital signature by performing verification on the generated signature response through the trust determination machine; and an access control step of determining access of the user and the user terminal to the server system according to the determined trust level of the user and the user terminal and a verification result of the digital signature.

* * * * *